W. SCHELLENBACH.
PROJECTILE TURNER.
APPLICATION FILED AUG. 25, 1915.
1,171,665.
Patented Feb. 15, 1916.
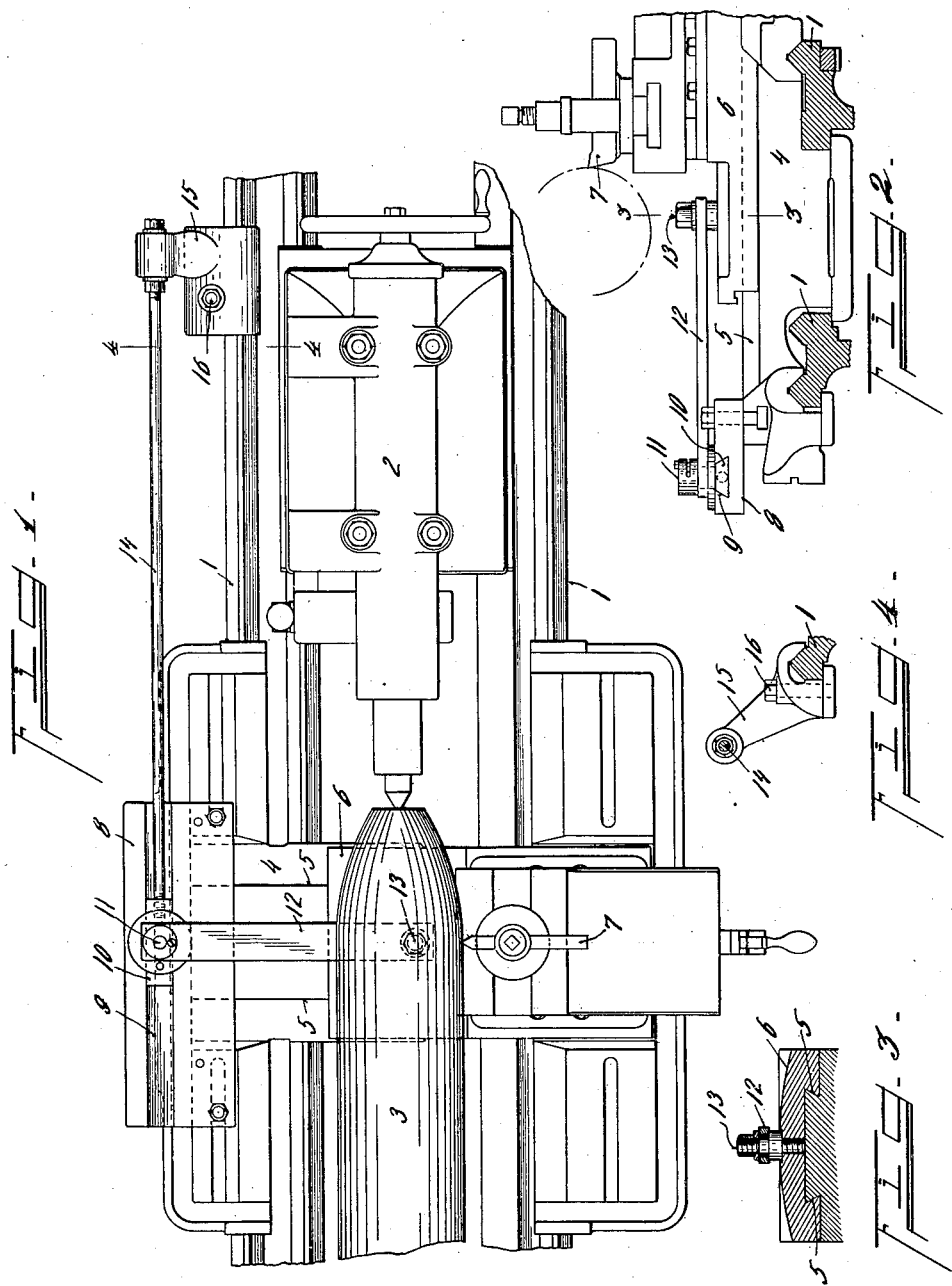

UNITED STATES PATENT OFFICE.

WILLIAM SCHELLENBACH, OF WYOMING, OHIO.

PROJECTILE-TURNER.

1,171,665.  Specification of Letters Patent.  Patented Feb. 15, 1916.

Application filed August 25, 1915. Serial No. 47,219.

*To all whom it may concern:*

Be it known that I, WILLIAM SCHELLENBACH, a citizen of the United States, and residing at 204 Elm avenue, Wyoming, in the county of Hamilton and State of Ohio, have invented a new and useful Improvement in Projectile-Turners, of which the following specification is a full disclosure.

My invention relates to machine tools and is more particularly directed to lathes for producing curved surfaces longitudinally.

The object of this invention is to provide a tool-slide controlled by a radius member functioned by the longitudinal travel of the carriage.

Another object of the invention is to provide a tool-slide, the transverse movement of which is controlled by a horizontally movable radius member operatively connected to the tool-slide and lathe-bed and functioned by the longitudinal travel of the carriage.

Other features and advantages will be more fully set forth in the description of the accompanying drawings, forming a part of this specification, in which:—

Figure 1 is a top plan view of a portion of a lathe showing my improved carriage. Fig. 2 is a partial left side elevation of the carriage. Fig. 3 is a detail section on line 3—3 of Fig. 2. Fig. 4 is a detail section on line 4—4, of Fig. 1.

In the drawings, 1 represents the lathe bed, 2 the tail-stock, and 3 the work as a finished projectile which is chucked in the usual face-plate (not shown) of the head stock. The carriage 4 is fed longitudinally on the bed by suitable feed mechanism of standard construction, and is provided with the usual transverse ways 5 upon which the tool-slide 6 travels to move the tool 7 to and from the work.

Secured to the back portion of the carriage is a guide plate 8, having a dove-tail way or slot 9 formed in its upper surface. The slot is parallel with the lathe bed or direction of carriage travel, and slidably mounted therein is a pivot block 10 having a fixed stud 11 projecting upwardly therefrom. A radius link 12 at one end is loosely pivoted on the stud 11, the opposite end being pivoted on a stud 13 fixed to the tool-slide 6. The pivot block 10 is held stationary relative to the carriage travel by a rod 14 which is secured thereto and extending parallel with the bed, secured in a bracket 15 detachably clamped to the bed by a clamp bolt 16. The pivot block 10 is confined against motion, longitudinally by the rod 14 fixed to the rail of the lathe bed, and transversely by the way or slot 9 of the guide plate 8, establishing a stationary fulcrum about which the radius link swings when the tool carriage is fed along the bed. The swing of the radius link, resulting from the longitudinal feed of the carriage, translates the tool-slide and its tool either toward or from the work in degrees, causing a tool edge feed along an arc or curve of a determined radius; in this instance the radius representing the length between the axes connecting the link to the pivot block and tool-slide. The pivot block is adjustable with the carriage by releasing the bracket 15 to properly position the parts relatively to the work. The radius link is capable of swinging upon either side of a line axially central with the tool cutting edge.

Having thus described my invention, I claim as new and desire to secure by Letters Patent of the United States:—

1. A device of the class described, comprising a bed, a longitudinally movable carriage, a transversely movable tool-slide carried thereby, a pivot block slidably supported by the carriage, means for restraining said block against movement, and a radius link pivotally connected to the pivot block and tool-slide.

2. A device of the class described, comprising a bed, a longitudinally movable carriage, a transversely movable tool-slide carried thereby, a pivot block supported by the carriage, means carried by the carriage for preventing transverse movement of the pivot block, means secured to the bed for preventing longitudinal movement of the pivot block, and a radius link pivoted on the pivot block and on the tool-slide.

3. A device of the class described, comprising a bed, a longitudinally movable carriage, a transversely movable tool-slide carried thereby, a grooved guide plate secured to the carriage, a pivot block confined within the groove of said guide plate, means rigidly securing said pivot block to the bed and a radius link pivoted to the pivot block and tool-slide.

4. A device of the class described, comprising a bed, a longitudinally movable carriage, a transversely movable tool-slide carried thereby, a grooved guide plate detachably secured to the carriage in parallel alinement with the bed, a pivot block confined within the groove of said guide plate, adjustable means for securing the pivot block to the bed, and a radius link pivoted at one end to the pivot block and at the opposite end to the tool-slide.

5. A device of the class described, comprising a bed having a plurality of parallel slide ways, a carriage longitudinally movable thereon, a transversely movable tool-slide carried by the carriage, a grooved guide plate detachably secured to the carriage in parallel alinement with the slideways, a pivot block confined within the groove of the guide plate, a bracket slidably mounted on one of said slide ways, means for clamping said bracket to the slide-way in adjusted position, a rigid connection between the bracket and pivot block and a radius link pivoted at one end to the pivot block, and at the opposite end to the tool slide to control the transverse tool slide movement during the longitudinal carriage travel.

6. A device of the class described, comprising a bed, a longitudinally movable carriage, a transversely movable tool slide carried thereby, a pivot block supported by the carriage, means for restraining said block against movement, and a horizontally movable radius link intermediate the pivot block and tool slide functioned by the longitudinal travel of the carriage to cause a transverse feed of the tool slide.

In witness whereof, I hereunto subscribe my name, as attested by the two subscribing witnesses.

WILLIAM SCHELLENBACH.

Witnesses:
 EMMA SPENER,
 CLARENCE B. FOSTER.